United States Patent [19]

Yu

[11] Patent Number: 5,243,427
[45] Date of Patent: Sep. 7, 1993

[54] CONTOUR CORRECTION APPARATUS AND CONTOUR CORRECTION METHOD

[75] Inventor: Jung-hyung Yu, Suwon, Rep. of Korea

[73] Assignee: Samsung Electronics Co., Ltd., Rep. of Korea

[21] Appl. No.: 875,440

[22] Filed: Apr. 29, 1992

[30] Foreign Application Priority Data

Dec. 27, 1991 [KR] Rep. of Korea ............... 91-24669

[51] Int. Cl.$^5$ .................. H04N 5/14; H04N 5/208
[52] U.S. Cl. ................................ 358/166; 358/162
[58] Field of Search ............. 358/36, 37, 166, 167, 358/162, 163, 96

[56] References Cited

U.S. PATENT DOCUMENTS 4,654,709  3/1987  Umezawa ..................... 358/166

FOREIGN PATENT DOCUMENTS 29-0469 11/1988 Japan .
261083 10/1989 Japan .

*Primary Examiner*—James J. Groody
*Assistant Examiner*—Glenton Burgess
*Attorney, Agent, or Firm*—Sughrue, Mion, Zinn, Macpeak & Seas

[57] ABSTRACT

A contour correction apparatus that includes memory for storing inverse correction values of a contour correction control signal in a reference table and a D/A converter for converting the inverse correction signal value output from the memory to an analogue signal. The apparatus improves the non-linear characteristic of the contour correction control quantity obtained. This control quantity controls the variation in the preshoot or overshoot added to a video signal according to the magnitude of a high-frequency component and the amount of correlation between horizontal scanning lines of the video signal, thereby obtaining a linear control characteristic.

9 Claims, 3 Drawing Sheets

AMOUNT OF CORRELATION BETWEEN THE HORIZONTAL SCANNING LINES OF THE VIDEO SIGNAL

MAGNITUDE OF THE HIGH-FREQUENCY COMPONENT IN THE VIDEO SIGNAL

SUM OF THE HIGH-FREQUENCY COMPONENT MAGNITUDE AND THE CORRELATION QUANTITY

CONTOUR CORRECTION APPARATUS AND CONTOUR CORRECTION METHOD

BACKGROUND OF THE INVENTION

The present invention relates to a contour correction apparatus capable of controlling the amount of preshoot or overshoot added to a video signal according to its high-frequency component and the correlation quantity between its horizontal scanning lines. More particularly, to an apparatus for improving the non-linearity between the level of the contour correction and a video signal's high-frequency component and horizontal line correlation.

The resolution of an image corresponding to the video signal reproduced by a reproducing unit, such as a VTR or a tuner of a television receiver, can be improved by adding preshoot or overshoot to the transitional portion of a video signal (i.e. a portion at which the video signal amplitude changes). This type of improvement is called contour correction and generally relates to the slope of the change in amplitude of a video signal. For example, by adding preshoot or overshoot to the transitional portion of a luminance signal that is changing from a white to a black level, the contrast between black and white is emphasized, thereby improving its resolution.

However, this type of contour correction apparatus adds a constant amount of contour correction to the transitional portion of a video signal, regardless of the picture's content (i.e., regardless of the video signal's frequency or horizontal line correlation). This insensitivity to video signal frequency and line correlation causes the picture quality to deteriorate in certain cases. For example, when using a constant correction value, the picture will appear rough in areas where motion is prevalent or where the picture makeup is very detailed since the contour correction signal becomes excessive in these areas (i.e. dominates the video signal).

An improved contour correction apparatus corrects these problems by varying the amount of contour correction based on the high-frequency component of the video signal and the amount of correlation between the horizontal scanning lines of the video signal. Specifically, the level of the contour correction is increased as the correlation quantity increases (i.e. the picture includes very little motion). Further, the amount of contour correction is increased as the high-frequency component of the video signal decreases (i.e. the picture has very few details). Conversely, as the correction quantity decreases or the video signal high-frequency component increases, the amount of contour correction decreases. Thus, the proper contour correction is set according to the amount of motion and detail in a picture.

However, this contour correction apparatus directly adjusts the contour control voltage based on the magnitude of the high-frequency component and the amount of correlation between horizontal scanning lines in the video signal. In other words, if the amount of correlation increases by 10%, then the contour control voltage was increased by 10%. Similarly, if the magnitude of the high-frequency component decreases by 10%, then the contour control signal was increased by 10%.

However, the contour correction apparatus uses non-linear semiconductors within the picture control unit to perform the actual contour correction. These semiconductors exhibit a non-linear relation between the control voltage that is input to the picture control unit and the actual contour correction applied to the video signal. FIG. 1 illustrates this non-linear relation between the control voltage applied to the picture control unit and the level (in dBs) of contour correction that is actually added to the video signal. Consequently, the actual level of contour correction does not maintain a linear relation to the high-frequency component and correlation quantities of the video signal. This non-linear relation is disadvantageous.

Further, analog devices are unable to compensate for this non-linear relation between the high-frequency/correlation quantities and the level of contour correction. Specifically, these analog devices are unable to perform the needed inverse correction, which would change the non-linear control characteristic into a linear control characteristic.

SUMMARY OF THE INVENTION

The object of the present invention is to provide an apparatus having a linear contour correction characteristic between the level of contour correction, used to control the amount of preshoot or overshoot added to a video signal, and the control signal, which represents the magnitude of a high-frequency component added with the amount of correlation between scanning lines in a video signal.

Another object of the present invention is to provide a method that ensures a linear contour correction characteristic between the level of contour correction, used to control the amount of preshoot or overshoot added to a video signal, and a summation signal representing the magnitude of a high-frequency component and a correlation quantity between scanning lines in the video signal.

The present contour correction apparatus achieves these objectives by controlling the amount of preshoot or overshoot added to a transitional portion of the video signal. The amount added is determined by an inverse correction value read from a reference table. The determined inverse correction value is identified by sum of the magnitude of the high-frequency component in the video signal and the amount of correlation between scanning lines.

Specifically, the present apparatus comprises memory for storing a plurality of inverse correction values in a reference table. These inverse correction values correspond to the contour correction control signal, which sets the level of the contour correction. The present apparatus also includes an address generator for generating a read-out address signal, which designates a reference table location corresponding to the appropriate contour correction control signal. The apparatus further includes a converter for converting the inverse correction value read from the table, into an inversely corrected analog contour correction control signal (hereafter referred to as the "inversely corrected control signal"). The converter supplies the inversely corrected control signal to the contour correction device. This inversely corrected control signal provides a linear relation between the amount of preshoot or overshoot to be added to the transitional portion of the video signal, and the magnitude of the high-frequency component and correlation quantity.

The present contour correction method achieves these objectives by controlling the amount of preshoot or overshoot added to a transitional portion in the video signal based on the magnitude of the high-frequency component of the video signal and its correlation quantity between scanning lines. The present contour correction method comprises the steps of composing a reference table of inverse correction values that correspond to the inversely corrected control signal, and supplying an inversely corrected control signal to the contour correction apparatus. The inverse correction value read from the reference table corresponds to a contour correction level designated by the high-frequency component and correlation quantity for the video signal.

BRIEF DESCRIPTION OF THE DRAWINGS

The above, and other objects, features and advantages of the present invention, will become apparent from the following detailed description of the preferred embodiments which is to be read in conjunction with the accompanying drawings, and throughout which like reference numerals identify the same or similar parts.

DETAILED DESCRIPTION OF THE INVENTION

Figure 1:
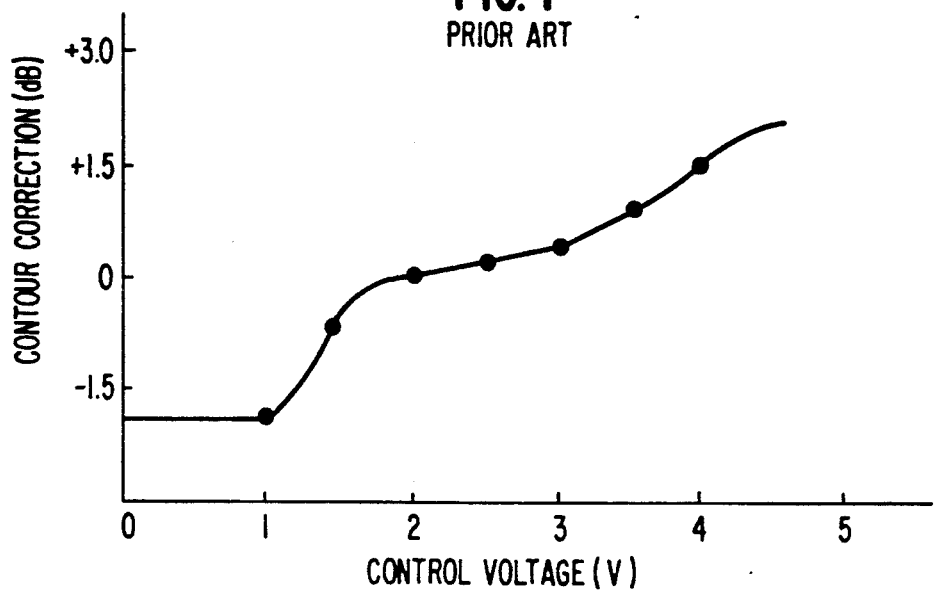
FIG. 1 shows the non-linear relation between a control voltage and a contour correction level within the picture control unit.

The graph in FIG. 1 illustrates the relation between the level of the contour correction added to the video signal in the picture control unit 11 (FIG. 2) and the control voltage applied to the picture control unit. In FIG. 1, the horizontal axis represents the control voltage, while the vertical axis represents the contour correction quantity in dB corresponding to a reference value of 1.8 MHz.

Figure 2:
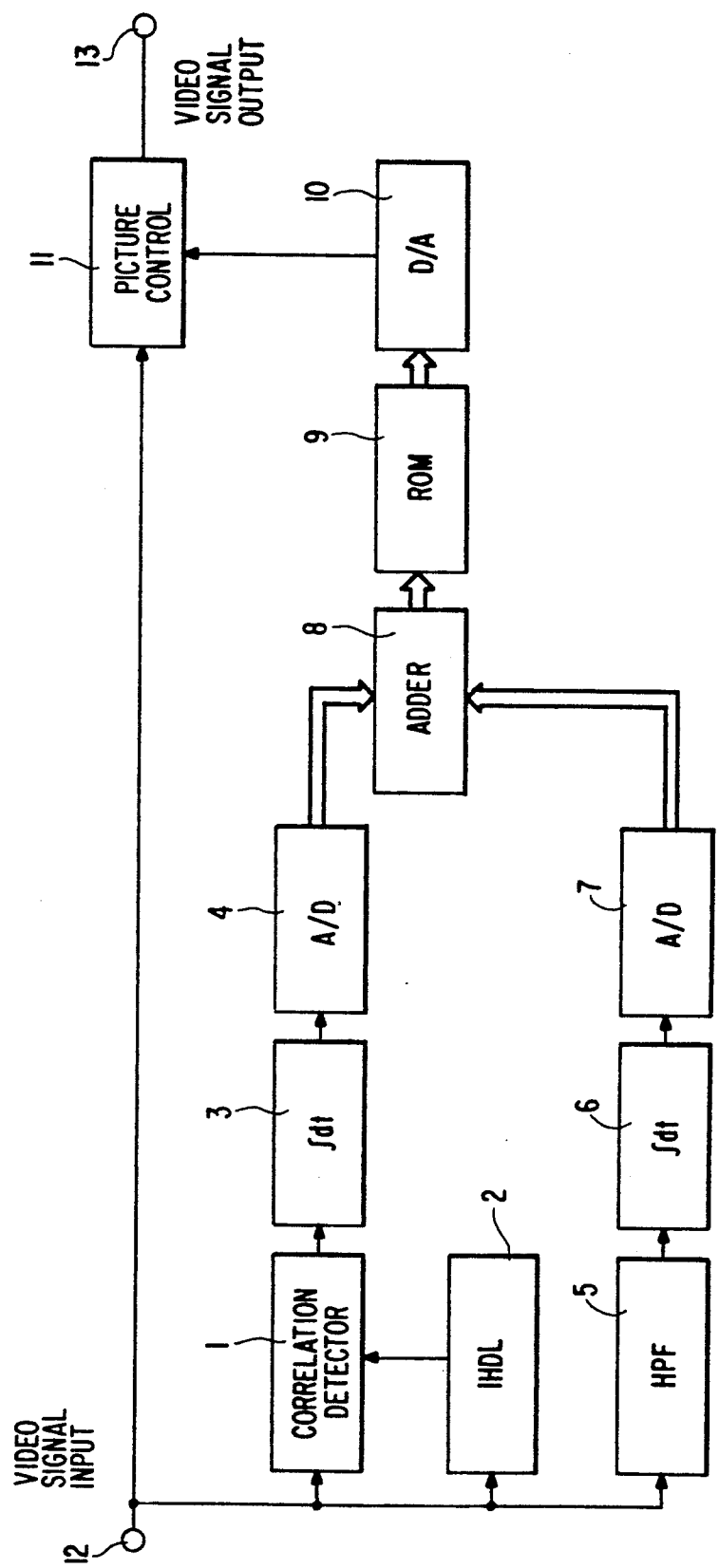
FIG. 2 shows an embodiment of the contour correction apparatus according to the present invention.

FIG. 2 shows an embodiment of the present invention. An input terminal 12 receives the video signal, including luminance and chrominance components, and an output terminal 13 outputs the contour-corrected video signal. A contour correction circuit 11 (also referred to as a picture control unit) generates a contour correction signal, which is added to the video signal supplied to input terminal 12. The contour correction signal is based on a signal from a D/A converter 10 (the inversely corrected control signal), which is received at a control terminal.

The inversely corrected control signal is based on the level of a high-frequency component and the correlation quantity representing the correlation between horizontal scanning lines in the video signal.

To detect the correlation quantity, horizontal delay line 2 delays each horizontal scan line received from input terminal 2 by one horizontal line. The correlation detector 1 detects an amount of correlation between a current horizontal scanning line received from the input terminal and a horizontal scanning line delayed in the horizontal delay line 2. Integrator 3 integrates the output of the correlation detector 1 and generates a DC component representative thereof.

To detect the magnitude of the high-frequency component in the video signal, a high-pass filter (HPF) 5 is used to detect this high-frequency component. Next, an integrator 6 integrates the output of the HPF 5, and forms a DC component representative thereof.

The A/D (analog-to-digital) converters 4 and 7 and an adder 8 convert and add the DC components from integrators 3 and 6 to form a summation. This summation constitutes an address designator, which identifies an corresponding address in ROM 9. ROM 9 stores a reference table of inverse correction values, each of which corresponds to a particular contour control signal to be added in the picture control unit 11 to the video signal. Thus, when a sum from adder 8 is output to ROM 9, the corresponding inverse correction value is written from the reference table to the D/A converter 10. The D/A converter 10 converts this inverse correction value into an analog signal, which represents the inversely corrected control signal, and supplies it to the control terminal of the picture control unit 11.

Figure 3:
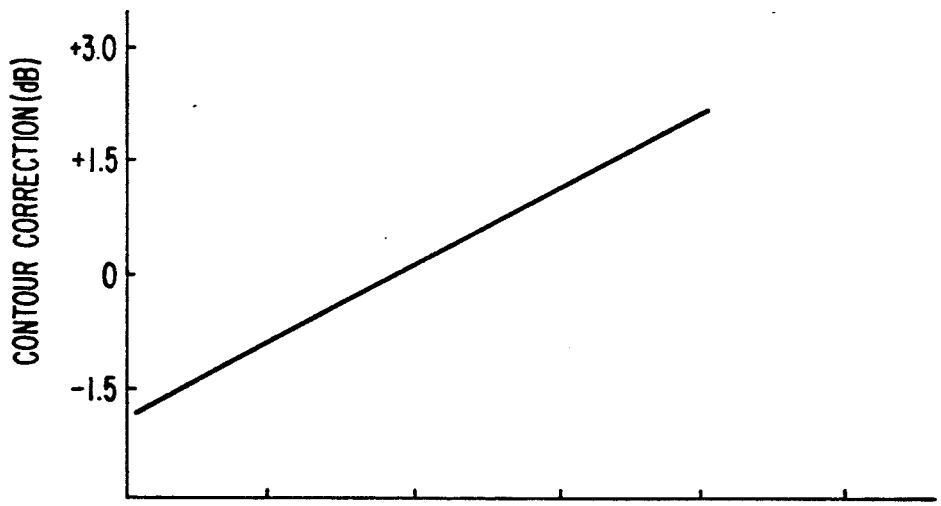
FIG. 3 shows the relation between a high-frequency component in the video signal and the desired level of contour correction.

The inverse correction values stored in the reference table are arranged to achieve a linear relation between the level of the contour correction and the high-frequency and correlation quantities. The solid line 40 in FIG. 3 illustrate this relation for the correlation quantity, wherein the level of contour correction increases in a linear relation to the amount of correlation between horizontal scanning lines (solid line 40). Thus, if the picture includes very little motion, the correlation quantity will be large and more preshoot or overshoot will be added to the video signal.

Figure 4:
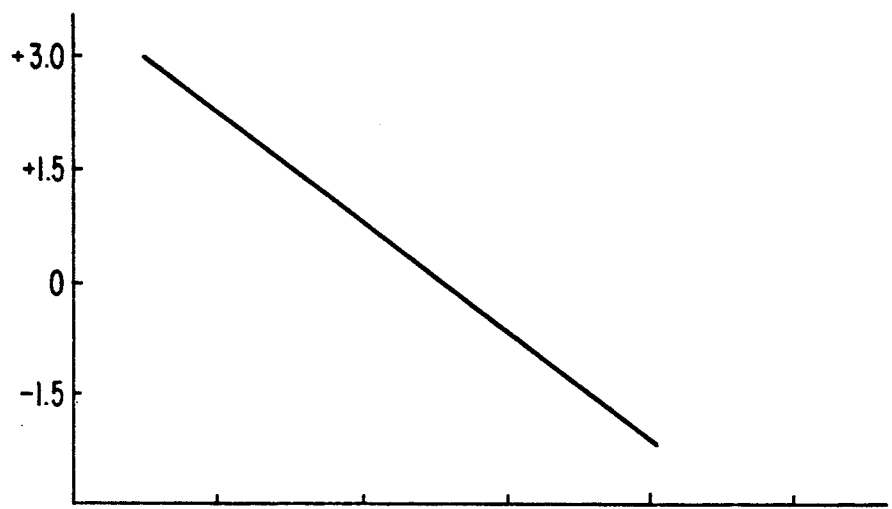
FIG. 4 shows the relation between the amount of correlation between the horizontal scanning lines in the video signal and the desired level of contour correction.

FIG. 4 illustrate the relation between contour correction and the high-frequency component, wherein the level of contour correction decreases in a linear relation with the magnitude of the high-frequency component (dashed line 50). Thus, if the picture is very detailed, the high-frequency component will be large and the contour correction will be small.

Figure 5:
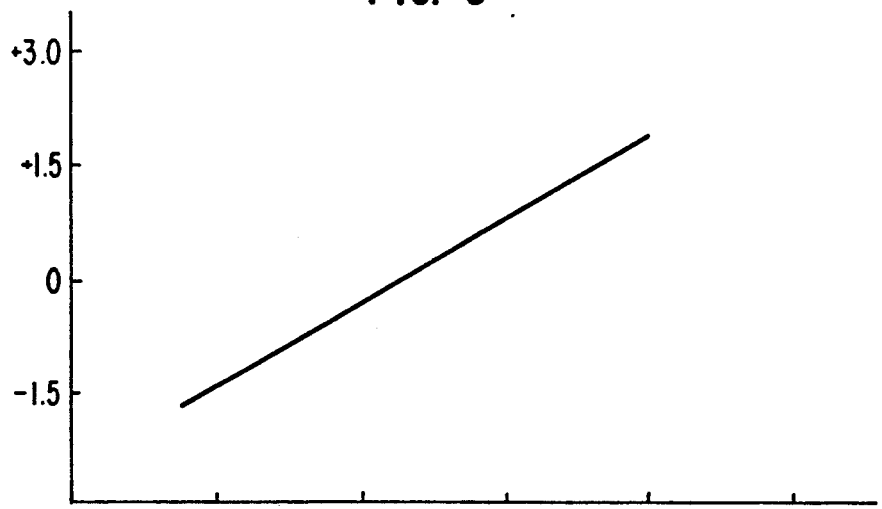
FIG. 5 shows the relation between a summation of the high-frequency component and the correlation quantity, and the level of contour correction.

The reference table in ROM 9 stores the appropriate inverse correction values at each address designated by adder 8 to obtain a desired actual contour correction level. For instance, if the detected high-frequency component and detected correlation quantity correspond to a contour correction level of +1.5 dB (FIG. 1), then the corresponding inverse correction value in the reference table will correspond to a 4 V control voltage. The summation of the detected high-frequency and correlation values designates a memory location that stores a correction value representing a 4 V control signal. Thus, the present invention achieves a linear relation (as illustrated in FIG. 5) between the contour correction level and sum of the high-frequency magnitude and correlation quantity.

During operation, the video signal, which includes luminance and chrominance signals, is input to picture control unit 11 via input terminal 12. The video signal is added to a contour correction signal, the level of which is designated by the inversely corrected control signal, and is output from terminal 13. The video signal from the terminal 12 is also input to the horizontal delay line 2 and the correlation detector 1 to obtain the correlation quantity between horizontal scanning lines. The correction quantity is integrated via integrator 3 to form a DC component, which is converted into a digital signal by A/D converter 4, and supplied to the first input terminal of adder 8.

The video signal is also input to HPF 5 where the high-frequency component included in the video signal is detected and integrated in integrator 6 to form a DC component. The DC component is converted into a digital signal by A/D converter 7, and supplied to the second input terminal of adder 8.

As noted above, as the picture becomes more detailed and the high-frequency component increases, it is advantageous to decrease to level of contour correction. This prevents the inclusion of a preshoot or overshoot signal that causes a rough picture. Accordingly, the integrator 6, A/D converter 7, adder 8 and ROM 9 operate to reduce the level of contour correction as the high-frequency component in the video signal increases.

The output of the adder 8 is supplied to the address terminal of ROM 9. The adder output is used as a read-out address signal to designate a location in the ROM 9, which contains the inverse correction value corresponding to the adder output signal. The inverse correction value, which corresponds to the adder output value, is converted into an analog signal in D/A converter 10, and supplied to the control terminal of picture control unit 11.

According to this structure, a signal representing the sum of the high-frequency component quantity and the correlation quantity between horizontal scanning lines of a video signal, is obtained. This signal is then added to the contour correction circuit via a non-linear correction circuit (i.e., the ROM 9 and D/A converter 10), thereby providing a linearly contour-corrected video signal according to the contents of a picture.

As mentioned above, the contour correction apparatus of the present invention improves the non-linear characteristic of a contour correction control quantity obtained due to the non-linearity of the contour correction apparatus controlling the amount of preshoot or overshoot added to a video signal according to the amount of a high-frequency component and the correlation quantity between horizontal scanning lines of a video signal, thereby obtaining a linear control characteristic.

What is claimed is:

1. A contour correction apparatus, for video signals, comprising:
   contour correction means for receiving a video signal and an inversely corrected control signal and for varying a level of contour correction by varying an amount of preshoot or overshoot added to a transitional portion of the video signal based on the inversely corrected control signal,
   memory means for storing a reference table containing a plurality of inverse correction values corresponding to said inversely corrected control signal; and
   address generating means for generating a read-out address designating a location in said reference table based on a magnitude of a high-frequency component in said video signal and an amount of correlation between scanning lines of said video signal, said memory and address generating means maintaining a linear relation between changes in said contour correction and changes in said high-frequency component magnitude and said correlation quantity.

2. A contour correction apparatus as claimed in claim 1, wherein said address generating means includes:
   means for detecting an amount of correlation between a current horizontal scanning line and a delayed horizontal scanning line in said video signal;
   means for detecting a high-frequency component in the video signal.

3. A contour correction apparatus as claimed in claim 2, wherein said address generating means includes
   means for converting said detected amount of correlation in the horizontal scanning lines and a magnitude of the high-frequency component into digital signals.

4. A contour correction apparatus as claimed in claim 3, wherein said address generating means includes:
   means for adding said digital signals representing said amount of correlation and said magnitude of said high frequency component to form said read-out address.

5. A contour correction apparatus as claimed in claim 1, further comprising:
   digital-to-analog-converter for converting said inverse correction value outputted from said reference table to said inversely corrected control signal.

6. A contour correction method, comprising the steps of:
   detecting a magnitude of a high-frequency component in a video signal and an amount of correlation between scanning lines of said video signal;
   storing a reference table containing a plurality of inverse correction values;
   generating a read-out address designating a location in said reference table, which contains a desired inverse correction value, based on the magnitude of said detected high-frequency component in said video signal and the amount of correlation between scanning lines of said video signal; and
   varying an amount of preshoot or overshoot to be added to a transitional portion of said video signal based on said desired inverse correction value.

7. A contour correction method as claimed in claim 6, further comprising the steps of:
   converting the desired inverse correction value into an analog signal; and
   using said analog signal as an inversely corrected control signal to linearly vary said amount of preshoot or overshoot added to said transitional portion of said video signal according to the magnitude of said high-frequency component and the amount of correlation between scanning lines.

8. A contour correction method as claimed in claim 6, said address generating step further comprising the steps of:
   converting said detected amount of correlation in the scanning lines and said detected magnitude of the high-frequency component into digital signals.

9. A contour correction method as claimed in claim 8, wherein said address generating step further comprises the steps of:
   adding said digital signals representing said amount of correlation and said magnitude of said high frequency component together to form said read-out address.

* * * * *